United States Patent
Chung (10) Patent No.: US 9,362,852 B2
(45) Date of Patent: Jun. 7, 2016

(54) GENERATOR ASSEMBLY AND RELATED DEVICES

(71) Applicant: Robert Chung, Midlothian, VA (US)

(72) Inventor: Robert Chung, Midlothian, VA (US)

( * ) Notice: Subject to any disclaimer, the term of this patent is extended or adjusted under 35 U.S.C. 154(b) by 206 days.

(21) Appl. No.: 14/013,748

(22) Filed: Aug. 29, 2013

(65) Prior Publication Data

US 2014/0070674 A1     Mar. 13, 2014

Related U.S. Application Data

(60) Provisional application No. 61/699,421, filed on Sep. 11, 2012.

(51) Int. Cl.
| | |
|---|---|
| H02K 7/18 | (2006.01) |
| H02N 11/00 | (2006.01) |
| H02N 99/00 | (2006.01) |

(52) U.S. Cl.
CPC .......... *H02N 11/002* (2013.01); *H02K 7/1853* (2013.01); *H02K 7/1876* (2013.01); *H02N 99/00* (2013.01)

(58) Field of Classification Search
CPC .... H02K 7/1853; H02N 99/00; H02N 11/002
USPC ........................................ 310/75 B; 290/1 R
See application file for complete search history.

(56) References Cited

U.S. PATENT DOCUMENTS

| | | | | |
|---|---|---|---|---|
| 4,227,092 | A * | 10/1980 | Campagnuolo et al. | 290/1 C |
| 4,746,806 | A * | 5/1988 | Campagnuolo et al. | 290/1 R |
| 6,034,492 | A * | 3/2000 | Saito et al. | 318/141 |
| 7,239,237 | B2 | 7/2007 | Hess | |
| 2006/0154690 | A1 | 7/2006 | Hess | |
| 2007/0029884 | A1* | 2/2007 | Terzian et al. | 310/40 MM |
| 2008/0180001 | A1* | 7/2008 | Dai | 310/75 B |
| 2009/0102418 | A1 | 4/2009 | Gaber | |

FOREIGN PATENT DOCUMENTS

| | | |
|---|---|---|
| CN | 201759313 | 3/2011 |
| CN | 202027367 U | 11/2011 |

* cited by examiner

*Primary Examiner* — Hanh Nguyen
(74) *Attorney, Agent, or Firm* — Gearheart Law, LLC (57) ABSTRACT

The current disclosure teaches and describes a generator assembly and related hand crank devices. One embodiment of the device may include a traditional generator, a handle and a crank link. The crank link is rotatably connected to the handle in a perpendicular position. A user may hold the handle and wield the hand crank device to make the crank link rotate around the handle like a clock hand, enabling the generator to provide power to the hand crank device. Such wielding motion may also be driven by other forces. The current design allows the user to charge the device with only one hand and with ease. In addition, the "functioning" components of the current hand crank device may be housed in or attached to either the handle or crank link, or both. Other components may also be introduced to make the generator assembly more efficient and easy to use.

16 Claims, 9 Drawing Sheets

GENERATOR ASSEMBLY AND RELATED DEVICES

CLAIM OF PRIORITY

This application claims the priority of U.S. Ser. No. 61/699,421 filed on Sep. 11, 2012, the contents of which are fully incorporated herein by reference.

BACKGROUND OF THE INVENTION

1. Field of the Invention

The current invention relates to generator assembly and devices, including hand crank devices and accessories. In particular, the current invention relates to generators and devices relying on the rotation of a handle-rotator combination to power the generator or charge the device by a rotatably wielding motion, which may be triggered and maintained by manual forces or other power sources.

Nowadays, generators are used for widely used in everyday life and they are sometime important parts of certain devices. However, it is still desirable to improve how the generators are powered. One example for generators and devices using generators is a hand crank device. Hand crank power supplies, radios, cell phone chargers, flashlights, and many combinations thereof, are supplied and marketed as emergency or first response devices. These devices are usually equipped with a generator or dynamo with an external crank handle, allowing a user to rotate the handle to generate electricity, either to power the device directly or charge a rechargeable battery that serves as the direct power source. With a readily available power source, the hand crank devices may be very useful and reliable when the user is on the road and/or in emergency situations such as in natural disasters.

Although some of the hand crank devices are also equipped with solar power panels, the use of such design is limited due to the dependency on the weather and the location of the user. The crank handle design remains the most reliable source to provide power. Such design, in its normal form today, has a significant shortcoming that it is physically challenging and time consuming to operate. The hand crank rotary handles are usually short and hard to grab. The rotations require significant force that must be exerted manually by the user. With strenuous rotation, only a minimum amount of energy may be used to provide power to the device. In general, the available hand crank devices have rotary handle designs that are hard to operate, demand strenuous efforts, and take a long time to generate enough energy. The current invention aims to address these issues and other related problems with other devices using a traditional generator.

2. Descriptions of Related Arts

U.S. Pat. No. 7,239,237 discloses a hand crank apparatus comprising a housing, a rechargeable battery source for providing a first source of direct current, a hand-crank dynamo configured to replenish the rechargeable battery source, and a direct current input receptacle configured for receiving a second source of direct current are disposed and held in the housing. An electric circuit is disposed and held in the housing and is in electrical communication with the rechargeable battery source and the direct current input receptacle to receive direct current from the first source of direct current or the second source of direct current. A cell phone charger output jack, in electrical communication with the electric circuit, is disposed and held in the housing. A radio receiver, disposed and held in the housing and in electrical communication with the electric circuit. The hank crank apparatus also includes a crank handle that may be manually operated by a user to generate power for the apparatus.

The invention identified above, however, illustrates the problem that the hand crank rotary system is difficult to operate and the device requires strenuous efforts to charge. In addition to this apparatus, various other devices are known in the art, but their structures are distinctively different from the current invention. Moreover, the other inventions fail to address all of the problems solved by the invention described herein. Several embodiments of this invention are illustrated in the accompanying drawings and will be described in more detail herein below.

SUMMARY OF THE INVENTION

The current invention discloses a generator assembly and accessories. The generator assembly comprises: a generator; a handle having a top end and a bottom end, the handle functionally connected to the generator; and a crank link having a proximal end and a distal end, wherein the proximal end of the crank link rotatably connects to the top end of the handle, and the crank link is capable of being positioned perpendicular to the handle. A user of the generator assembly may hold the handle and wield the generator assembly to make the crank link rotate around the handle like a clock hand around the center of a clock, enabling the generator to produce electricity. Moreover, the wielding motion may also be driven by power sources other than manual force, as indicated below.

"Wielding" is a motion exerted by a power source, such as but not limited to manual force, wind, water flow, tides; and hot vapor, so that the top end of the handle may swirl around a central hypothetical axis. The bottom end of the handle remains relatively still or swirl in an opposite direction as the top end, but with a smaller radius. For the current invention, the "wielding" motion in the current invention is produced by the user in some embodiments, however, in other embodiments specific structures may be used to produce the same effects, while the user is only required to trigger the motion.

The generator assembly may stand lone or be connected to all kinds of devices, such as a hand crank device. The hand crank device may be any kind of device such as but not limited to a flash light, flashlight or other lights, radio, cell phone charger, power source, computers, CD or mp3 players, TV, heater or cooker, washer or dryer, walkie-talkie, or any other appliances or apparatus that may be powered by electricity, or any combinations thereof. A traditional generator or dynamo may be connected to the hand-crank structures of the current invention. The mechanism and general design or such generators and dynamos are known in the art. The key feature is that such elements may be connected and driven by the rotation of a hand-crank link combination. For clarity purposes, hand crank devices are used as examples as to how the generator assembly is used. However, as indicated above, the wielding motion, which is the power source of the generator, may be driven by any type of power.

The conventional design of hand crank devices usually requires a person to hold the device with one hand, while grabbing the short arm of crank to rotate with the other hand. The current design allows the user to wield the hand crank device having a handle-crank link combination to charge, using only one hand. This is important, for instance, when the user has other necessities to carry. The key components to allow the cranking and wielding motions are the crank link and the handle, which are preferably perpendicular to each other when in operation. The crank link and handle are rotatably connected so that the user can take hold of the handle and wield the device, allowing the crank link to rotate around the handle. To ensure that the wielding motion is sufficient to drive the rotation of the crank link, the relative length and weight of the handle and the crank link is important. To facilitate the wielding/rotating motion, it is preferred to have a weight member attached to the distal end of the crank link.

The "functioning" elements of the hand crank device may have any design and may be installed any where. For example, the hand crank device may be a flashlight with a light source; the handle may be hollow with an interior; and the light source may reside in the interior of the handle. Alternatively, the crank link may be hollow and the light source may be kept in the interior of the crank link.

The hand crank device may be powered directly by the rotating motion of the crank link. Alternatively and preferably, the hand crank device may include a rechargeable battery connected to the generator, wherein power provided by the generator charges the rechargeable battery, which provides electricity to the power-consuming elements of the device.

It is possible that the relative position of the crank link and the handle are fixed. However, the preferred design is that the crank link and the handle may tilt towards and away from each other. For example, the hand crank device may include a hinge connecting the crank link to the handle, wherein the hinge allows the crank link to pivot against the handle between a parallel position and a perpendicular position. In a parallel ("closed") position, the handle and the crank link are side by side, preferably held flush against one another, making the device more compact and easier to carry. In a perpendicular ("open") position, a user may take hold of the handle and wield the device to power it directly or charge a rechargeable battery.

Within the purview of the current invention are also accessories to hand crank devices or other devices already on the market. Such accessories, after being attached to existing hand crank devices, would produce a combination having similar designs as indicated above, allowing the hand crank device to be charged and/or powered by a wielding motion. For example, the accessory may be a handle with an attachment assembly, which may be connected to the crank structures already installed on a hand crank device. In a combined form, the main body of the hand crank device is preferably perpendicular to, and rotatably connected to the handle. The handle is elongated so that an adult may easily hold the handle and wield the hand crank device, charging and/or powering the devices with only one hand of the user being occupied.

While the generator assembly and related hand crank device of the current invention generally involves allowing a user to wield the device to charge and/or power it, various alternative embodiments are being disclosed herein. In addition to the models indicated above, to improve its efficiency, the hand crank device having the generator assembly may comprise: a crank link having a proximal end and a distal end; a generator functionally connected to the crank link; a handle having a top end and a bottom end; a crank plate having a center and a circular gear groove track on top of the crank plate; and a gearwheel attached to the distal end of the crank link, wherein the proximal end of the crank link rotatably connects to the top end of the handle and is capable of being positioned perpendicular to the handle, the center of the crank attaches to the top end of the handle, the crank plate is capable of being positioned perpendicular to the handle, the crank link is capable of being positioned above the crank plate, the gear groove track has gear grooves that engages the gearwheel, and holding the handle and wielding the hand crank device make the crank link to rotate around the handle, causing the gearwheel to rotate and enabling the generator to provide power to the hand crank device. In such a design, the gearwheel is either perpendicular or parallel to the crank plate, depending on the form of the gear groove track. The rotation of the crank link is transformed to the rotation of the gearwheel, which may be functional attached to the generator, either directly or through a gear box. The number of rotations in a certain period by the gearwheel is determined by the corresponding structure of the gearwheel and gear grooves. Such a design allows high efficiency powering of the generator.

The wielding motions do not always have to be controlled with a human hand. Other power sources may be used and other control mechanisms may be applied. For example, sling support systems may also be used to provide a scaffold that suspends the handle-crank link combination and allows the crank link to rotate. An initial push from a human hand may be sufficient to trigger wielding motions in a certain time period in which the crank link rotates to drive the generator.

In general, the present invention succeeds in conferring the following, and others not mentioned, desirable and useful benefits and objectives.

It is an object of the present invention to provide a device having a generator assembly that allows a user to wield the generator assembly to power and/or charge the device.

It is an object of the present invention to provide a generator assembly that may be driven by different types of power such as manual force, wind, water flow, tides, and hot vapor.

It is an object of the present invention to provide a generator assembly that has a handle and a crank link rotatably connected to each other.

It is an object of the present invention to provide a hand crank flash light having a hollow handle wherein the light source resides in the handle.

It is an object of the present invention to provide a hand crank flash light having a hollow crank link wherein the light source resides in the crank link.

It is an object of the present invention to provide a generator assembly having a generator that may be powered by the wielding motion produced by a user's hand.

It is an object of the present invention to provide a generator assembly and related hand crank devices that are simple in structure and easy to manufacture.

It is an object of the present invention to provide a hand crank device that is suitable for outdoor settings.

It is an object of the present invention to provide a hand crank device that is suitable for emergency situations.

It is another object of the current invention to provide a hand crank device that is light and easy to use.

It is another object of the current invention to provide hand crank device accessories that may be attached to existing hand crank devices, allowing the devices to be charged and/or powered by wielding the device.

It is still another object of the current invention to provide a hand crank device that has a rechargeable battery.

It is another object of the current invention to provide a hand crank device that is a light, radio, cell phone charger, power source, computers, CD or mp3 players, TV, heater or cooker, washer or dryer, walkie-talkie, or any other appliances or apparatus that may be powered by electricity, or any combinations thereof.

It is yet another object of the current invention to provide a hand crank device that uses accessory structures for the wielding motion.

It is another object of the current invention to provide a generator assembly that uses a sling support system to support and suspend the handle-crank line combination.

It is yet another object of the current invention to provide a generator assembly and related hand crank devices that are durable.

It is yet another object of the current invention to provide a generator assembly and related hand crank devices that are compact.

It is an object of the present invention to provide a generator assembly and related hand crank devices that may be adjusted in size and the relative positions of the components.

The embodiments below are hand crank devices using the generator assembly. However, as indicated above, the embodiments only serve as examples and it is noted that the generator assembly may be used for other devices.

DESCRIPTION OF THE PREFERRED EMBODIMENTS

The preferred embodiments of the present invention will now be described with reference to the drawings. Identical elements in the various figures are identified, as far as possible, with the same reference numerals. Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention. It should also be noted that some features in some embodiments are not fully described in that particular embodiment because it is addressed in another embodiment. When a particular feature is included in multiple embodiments, the detailed description regarding that feature should apply to all the embodiments as long as no contradictions arise.

Figure 1:
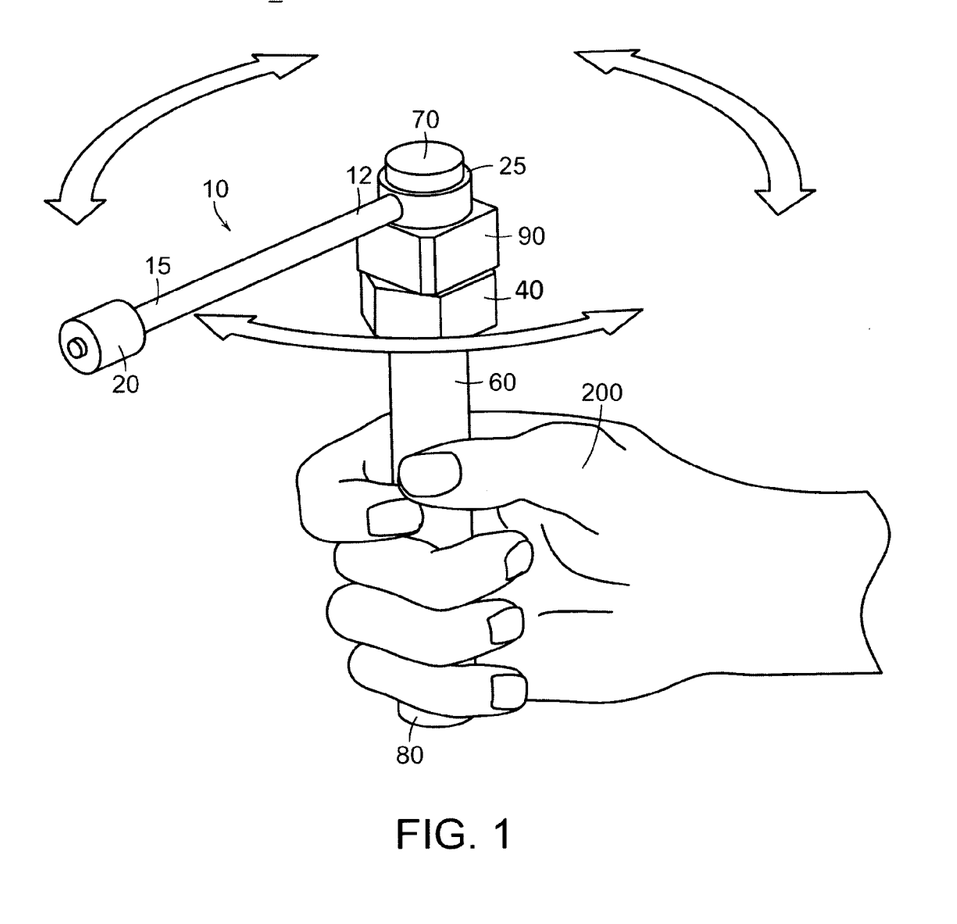
FIG. 1 shows a perspective view of a first embodiment of a hand crank device.

FIG. 1 shows a perspective view of a first embodiment of a hand crank device. Shown in FIG. 1 is the hand crank device 1 having a handle 60 and a crank link 10, the handle 60 having a top end 70 and a bottom end 80, and a crank link 10 having a proximal end 12 and a distal end 15. The proximal end 12 of the crank link 10 rotatably connects to the top end 70 of the handle 60. The crank link 10 is generally perpendicular to the handle 60. Also shown in FIG. 1 is a generator 40 attached to the handle 60. A weight member 20 is attached to the distal end 15 of the crank link 10. An optional gear box 90 may also be attached to the handle-crank link combination to facilitate the transmission of rotation to the powering of the generator 40.

A user of the hand crank device 1 may hold the handle 60 in his/her hand 200 and wield the hand crank device 1 to make the crank link 10 rotate around the handle 60, either in a clock-wise or a counter-clock-wise direction, as shown by the arrows in FIG. 1. The rotation of the crank link 10 drives the generator 40 to provide power to the hand crank device 1.

It should be noted that there is no strict requirement that the crank link 10 stays above the handle 60 during the wielding motion. The hand crank device 1 may be used upside-down so that during the wielding motion, the handle 60 is above the crank link 10. This may also be described as the crank link 10 is connected to the bottom end 80, instead of top end 70 of the handle 60. The wielding motion itself may also be slightly different when the relative position of the handle 60 and crank link 10 are reversed. Nevertheless, the actual charging process of the hand crank device 1 stays the same, no matter where the crank link 10 is positioned. The "up-side-down" alternative also applies to other embodiments of the current invention. For simplicity, the descriptions in general with focus on the cases that the crank link 10 is above the handle 60.

To make the wielding motion successful, the handle 60 is preferred to be long enough to grab but not too long to be cumbersome and cause inconvenience, depending on the type of the device. The length of the handle 60 may be between 1-50 cm, with the preferred range of 3-20 cm. The length of the crank link 10 may vary as well within a range of 1-100 cm, with the preferred range of 3-30 cm.

The crank link 10 is the part of the crank structure that is rotating around the handle 60. The crank link 10 may be a rigid rod, as shown in FIG. 1. However, the crank link 10 may also be a flexible string or a casing that may serve different functions, as shown in later embodiments. The crank link itself may be the "functioning" structure of the handle crank device. For example, the crank link may be the body of a flashlight, or the body of a radio. The current invention may be adopted, as indicated above, in any kind of hand crank devices. Alternatively, the crank link may also be an attachment accessory onto which a commercially available hand crank device may be attached. Similarly, the current invention may fit to any kind of handle crank devices.

The weight member 20 is an optional structure. When the weight of the crank link 10 itself and/or any attachment to the crank link 10 is sufficient to allow an easy and efficient wielding motion to drive the generator, there is no need to attach a weight member 20 to the distal end 15 of the crank link 10. However, in some cases adding the weight member 20 is essential to ensure that the user may hold the handle and wield the device to make the crank link rotate. The weight of the weight member 20 may vary according to the parameters of other parts and the target rotating speed and resistance. The weight of the weight member 20 may range from 10 g to 5 kg, with the preferred range of 50 g to 1 kg.

The crank link 10 is rotatably connected to the handle 60 with a rotation joint 25. The specific design of such rotation joint 25 may vary according to the particular need of the device. For example, the rotation joint 25 may comprise a circular ring at the proximal end 12 of the crank link 10 wrapping around an indented axis at the top end 70 of the handle 60. Other structures, as indicated above, may also be adopted. The rotation joint 25 is preferred to be sufficiently lubricated to ensure minimum resistance and maximal efficiency.

The generator 40 is driven by the mechanical rotation of the handle-crank link combination. The detailed structure of the generator 40 is known in the art and may vary according to the needs of the device as a whole. The generator 40 may provide electricity directly to the hand crank device, or to a rechargeable battery as part of the device so that the battery may provide electricity directly. The generator 40 may convert 0.1 to 500 watts per hour, with the preferred conversion of 0.5 to 50 watts per hour. The generator 40 may be connected directly to the handle 60 or the crank link 10. However, the generator 40, the handle 60, and the hand crank 10 may all be functionally connected to ensure efficient function of the generator 40.

The gear box 90 is an optional structure. It may house a gear combination so that the rotation of the crank 10 may be efficiently transferred to the generator, allowing the generator to produce power to the hand crank device 1.

The hand crank device may be made from any material, depending on the specific designs of the product, the functional requirements, the user's preference, and other factors such as cost and marketing potentials. Various components of the hand crank device may be made from the same or different materials. More specifically, the hand crank device may be made from materials that are strong and durable, including but not limited to metals, glass or fiberglass, rubber, composite materials, and plastic such as, but not limited to, polyethylene terephthalate (PET), high-density polyethylene, polyvinyl chloride (PVC), polyvinylidene chloride (PVDC), polystyrene (PS), high impact polystyrene (HIPS) and polycarbonate (PC), or some combination thereof.

Figures 2A, 2B:
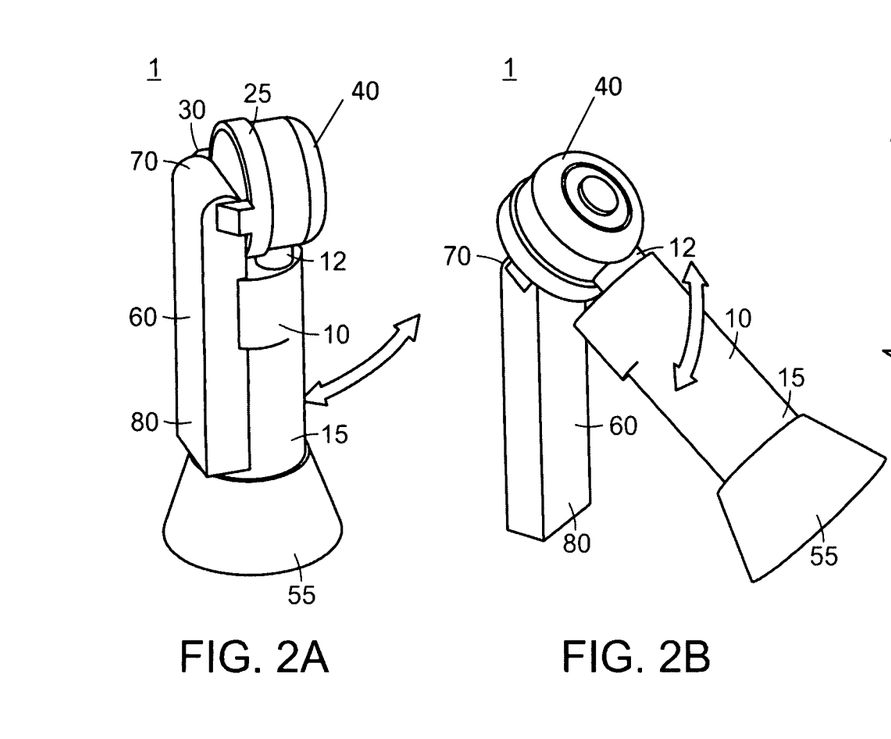
FIG. 2A shows a perspective view of a second embodiment of the hand crank device when the crank link is in a "closed" position.
FIG. 2B shows a perspective view of the second embodiment of the hand crank device when the crank link is being opened.
Figure 2C:
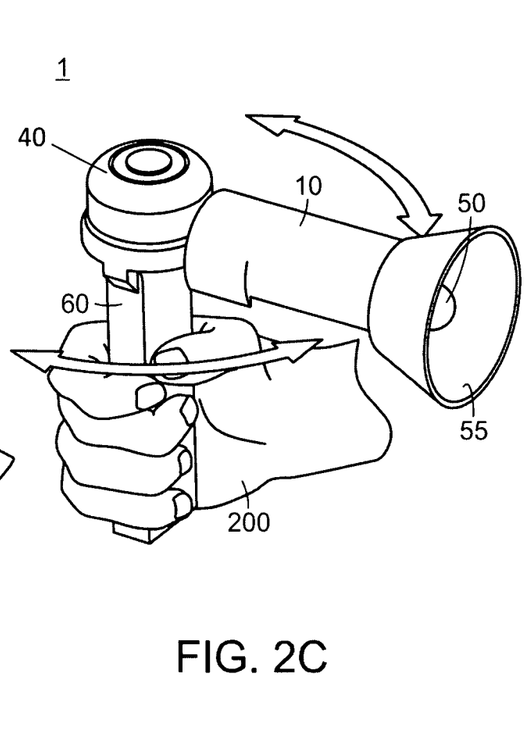
FIG. 2C shows a perspective view of the second embodiment of the hand crank device when the crank link is in an "open" position and being wielded.

FIGS. 2A, 2B, and 2C show a second embodiment—a flashlight—of the hand crank device 1. FIG. 2A shows a perspective view of the flashlight when the crank link 10 is in a "closed" position. FIG. 2B shows a perspective view of the flashlight when the crank link 10 is being opened. FIG. 2C shows a perspective view of the flashlight when the crank link 10 is in an "open" position and being wielded. FIGS. 2A, 2B, and 2C show essentially the same elements. Therefore, some elements are not marked in one of the figures for clarity purposes. Markings for such elements may be located in another figure.

Shown in FIG. 2A is the hand crank device 1 having a handle 60 and a crank link 10, the handle 60 having a top end 70 and a bottom end 80, and a crank link 10 having a proximal end 12 and a distal end 15. The crank link 10 is attached to the handle 60 through a hinge 30, which allows the crank link 10 to pivot against the handle 60. In FIG. 2A, which shows a "closed" position, the crank link 10 is parallel to and held flush against the handle 60. In FIG. 2B, the handle 60 is pivoting away from the crank link 10. In FIG. 2C, the crank link 10 is generally perpendicular to the handle 60, indicating that the hand crank device is in an "open" position. In addition to the hinge connection 30, the proximal end 12 of the crank link 10 is also rotatably connected to the top end 70 of the handle 60 with a rotation joint 25, allowing the crank link 10 to rotate around the handle 60 as shown in FIG. 2C.

In the second embodiment, the hand crank device 1 is a flashlight. A user of the hand crank device 1 may and hold the handle 60 in his/her hand 200 and wield the hand crank device 1 to make the crank link 10 to rotate around the handle 60, either in a clock-wise or a counter-clock-wise direction, as shown by the arrows in FIG. 2C. The rotation of the crank link 10 drives a generator to provide power to the flashlight. As indicated above, the flashlight design serves as an example for the usage of the wieldable hand-crank link combination. Other "functions," such as radio or cell phone charger may also be implemented into the hand crank device 1 shown here.

As a flashlight, the second embodiment may have a light source 50. The crank link 10 is hollow and has an interior, wherein the light source 50 mainly resides in the interior. The flashlight may also include a reflector 55, which may serve as a weight member. A generator is also included in the second embodiment, preferably located within the rotation joint 25. Preferably, the second embodiment may also include a rechargeable battery, which may be charged by the generator and provide electricity to the light source 50. Moreover, the light source 50 may be positioned within the handle 60, instead of the crank link 10. In that case, the user holds the handle 60 that accommodates the light source to wield the hand crank device to make the crank link 10 rotate, generating the power to sustain the device. As indicated above, the device may be wielded up-side-down.

Figures 3A, 3B, 3C:
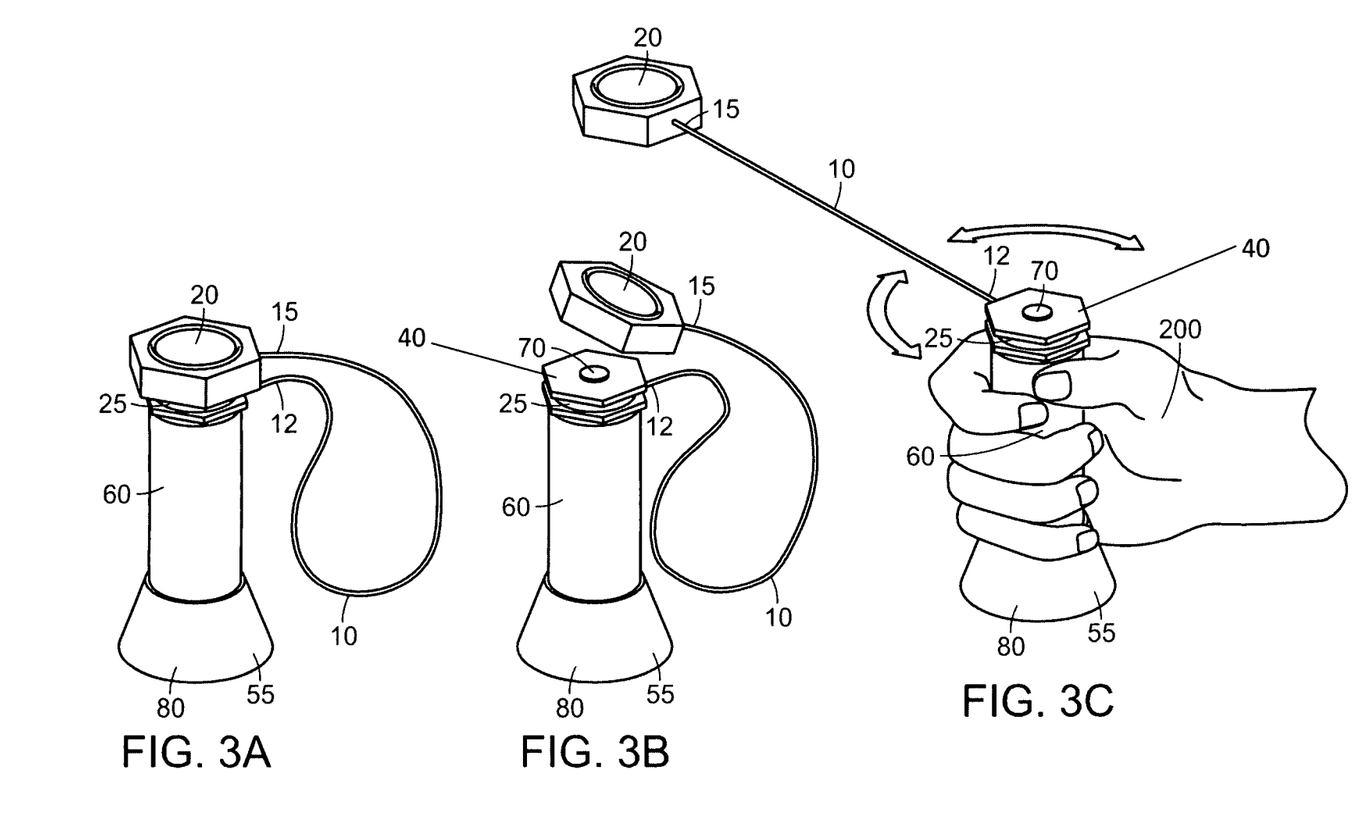
FIG. 3A shows a top perspective view of a third embodiment of the hand crank device when the weight member is attached to the handle.
FIG. 3B shows a top perspective view of the third embodiment of the hand crank device when the weight member is detached from the handle.
FIG. 3C shows a top perspective view of the third embodiment of the hand crank device when the weight member is detached from the handle and the crank link is being wielded.

FIGS. 3A, 3B, and 3C show a third embodiment—another flashlight—of the hand crank device 1. FIG. 3A shows a top perspective view of a third embodiment when the weight member 20 is attached to the handle 60. FIG. 3B shows a top perspective view of the third embodiment when the weight member 20 is detached from the handle 60. FIG. 3C shows a top perspective view of the third embodiment when the weight member 20 is detached from the handle 60 and the crank link 10 is being wielded. FIGS. 3A, 3B, and 3C show essentially the same elements.

Shown in FIG. 3A is the hand crank device 1 having a handle 60 and a crank link 10, the handle 60 having a top end 70 and a bottom end 80, and a crank link 10 having a proximal end 12 and a distal end 15. The proximal end 12 of the crank link 10 rotatably connects to the top end 70 of the handle 60 with a rotation joint 25. Here in the third embodiment, the crank link 10 is an elongated and flexible string. There is a weight member 20 attached to the distal end 15 of the crank link 10. In addition, the weight member 20 is also removably attached to the top end 70 of the handle 60. "Removable attachment" indicates that the removal of the weight member 20 from the handle 70 does not affect the physical integrity of these components. As indicated above, FIG. 3A shows the weight member 20 being attached to the handle 60. FIG. 3B shows the weight member 20 being detached from the handle 60. FIG. 3C shows that the weight member 20 is detached from the handle 60 and the crank link 10 is being wielded.

As the second embodiment, the third embodiment of the hand crank device 1 is a flashlight. However, the light source is kept in the interior of the handle 60. The reflector 55 of the flashlight, in the third embodiment, is located at the bottom end 80 of the handle 60. A user of the hand crank device 1 may and hold the handle 60 in his/her hand 200 and wield the hand crank device 1 to make the crank link 10 to rotate around the handle 60, either in a clock-wise or a counter-clock-wise direction, as shown by the arrows in FIG. 3C. The rotation of the crank link 10 drives a generator to provide power to the flashlight. As indicated above, the flashlight design serves as an example for the usage of the wieldable hand-crank link combination. Other "functions," such as radio or cell phone charger may also be implemented into the hand crank device 1 shown here.

The weight member 20 here may be removably attached to the top end 70 of the handle 60. Since the crank link 10 in the third embodiment is an elongated and flexible string, it may be used as carrying or attachment strap for the flashlight when the crank link 10 is not used to generate power. A user may use the crank link to hang the flashlight around the neck or arm, allowing the use to carry the flashlight around hand-free.

Figure 4A:
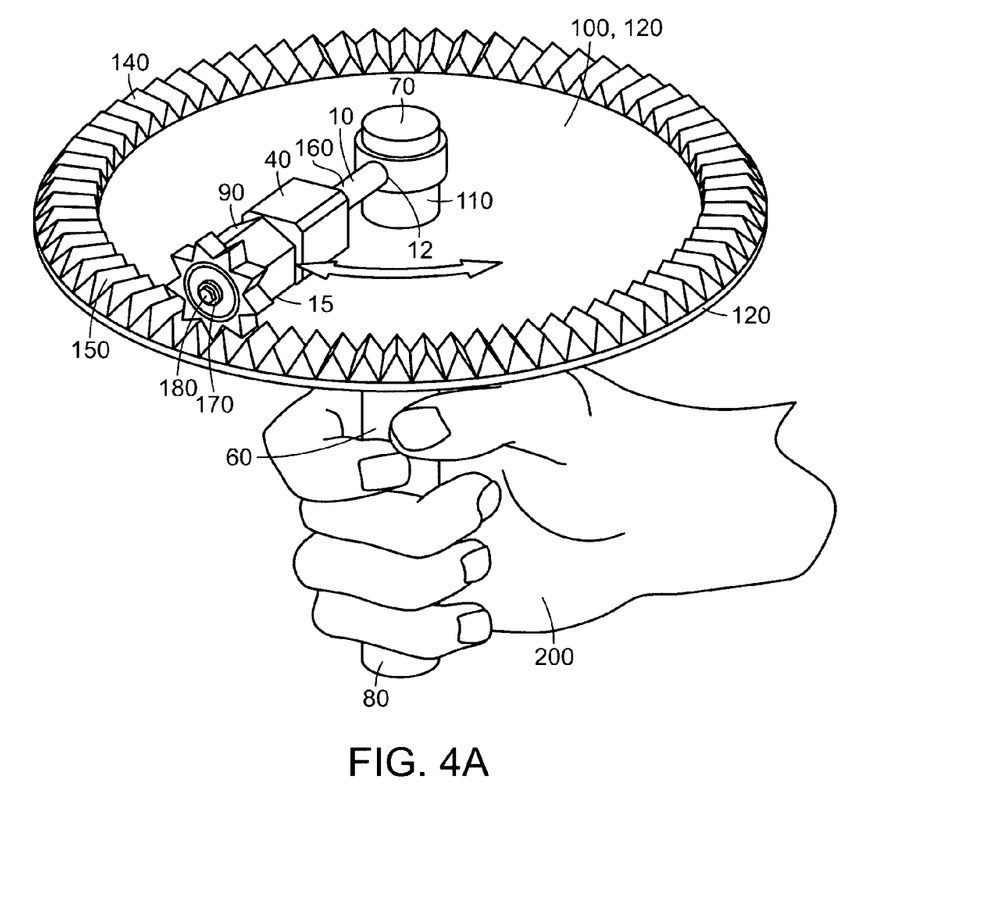
FIG. 4A shows a top perspective view of a fourth embodiment of the hand crank device having a crank plate with a gear track, wherein the gearwheel is perpendicular to the crank plate.

FIG. 4A shows a top perspective view of a fourth embodiment of the hand crank device 1. Here the hand crank device 1 comprises a handle 60 and a crank link 10, the handle 60 having a top end 70 and a bottom end 80, and a crank link 10 having a proximal end 12 and a distal end 15. The proximal end 12 of the crank link 10 rotatably connects to the top end 70 of the handle 60. The crank link 10 is generally perpendicular to the handle 60. In addition, the fourth embodiment also includes a crank plate 100 having a center 110 and a top side 120. On the periphery of the crank plate 100 there is a circular gear groove track 140 having gear grooves 150. The center 110 of the crank plate 100 attaches to the top end 70 of the handle 60 and the crank plate 100 is generally perpendicular to the handle 60. The crank link 10 is parallel to and positioned above the crank plate 100. Also shown in FIG. 4A is a generator 40 attached to the crank link 10. Moreover, a gear wheel 180 is attached to the distal end 15 of the crank link 10. The gear wheel 180 is generally perpendicular to the gear groove track 140 and engages the gear grooves 150. An optional gear box 90 may also be attached to the crank link 10 to facilitate the transmission of rotation to the powering of the generator 40.

Figure 4B:
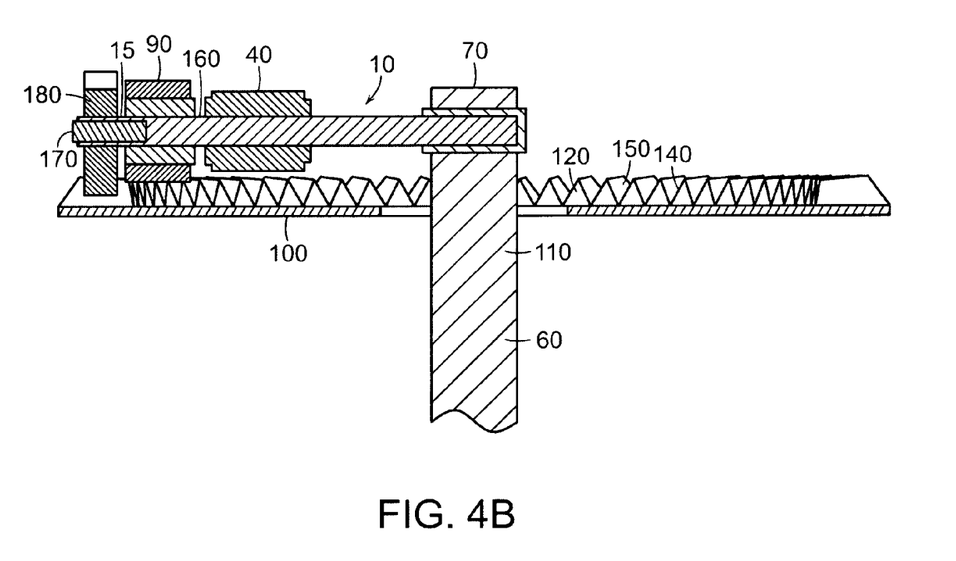
FIG. 4B shows a side sectional view of the fourth embodiment of the hand crank device having a crank plate with a gear track.

FIG. 4B shows the side sectional view of the further embodiment along a plain across the handle 60 and crank link 10. Essentially the same elements are shown in FIG. 4B as in FIG. 4A, except that the detailed structure of the crank link 10 is illustrated in FIG. 4B.

The fourth embodiment, as well as some embodiments shown below, is designed to enhance the efficiency and power generating capacity of the hand crank device. For this embodiment, a user may take hold of the handle 60 and wield the device, making the crank link 10 to rotate around the top end 70 handle 60 like a clock arm around a clock center. The crank link 10 may comprise a center shaft 170 and an outer shaft 160, as shown in FIG. 4B, wherein the outer shaft 160 encircles the center shaft 170 and the two shafts share an axis along the length of the crank link 10.

When the user wields the handle 60 so that the crank link 10 rotates around the handle 60, the gear wheel 180 engages the gear grooves 150 so that the gear wheel, which is directly affixed to the center shaft 170, rotates around the axis of the crank link 10, thus making the center shaft 170 to rotate as well. The center shaft 170 rotates within the outer shaft 160. The center shaft 170 is functionally connected to the gear box 90, which further drives the generator 40 to produce electricity to power the hand crank device 1 or charge a rechargeable battery. It should also be noted that the gear wheel 180 may be connected directly to the outer shaft 160 that rotates with the gear wheel 180, while the center shaft 170 does not rotate.

Such a conversion of rotary motion is highly efficient. Suppose the gear wheel 180 has a teeth number of n, and the gear grooves 150 have a groove number of m, the number of full rotations of the outer shaft resulted from a full circle of the crank link 10 is:

$$m/n.$$

For example, when n=9 and m=72, as shown in FIG. 4, a full circle of the crank link 10 results in 8 (72/9) full rotations of the outer shaft. It is clear that n and m may vary according to factors such as size of the device, targeted efficiency, and friction. Preferably, n ranges from 2 to 72 and m ranges from 6 to 1024.

Here in the four embodiments, the gear grooves 150 are generally perpendicular to the crank plate 100 so that the gear wheel 180, which attaches to the crank link 10, may properly engage the gear grooves 150. However, as shown in later embodiments, it is possible that the orientations of the gear grooves and the gear wheel are different from what is illustrated in FIGS. 4A and 4B. As long as the teeth of the gear wheel properly engage the gear grooves so that movement of the crank link transforms to the rotation of the gear wheel and its attached structures, any format is acceptable.

Figures 5A, 5B, 5C:
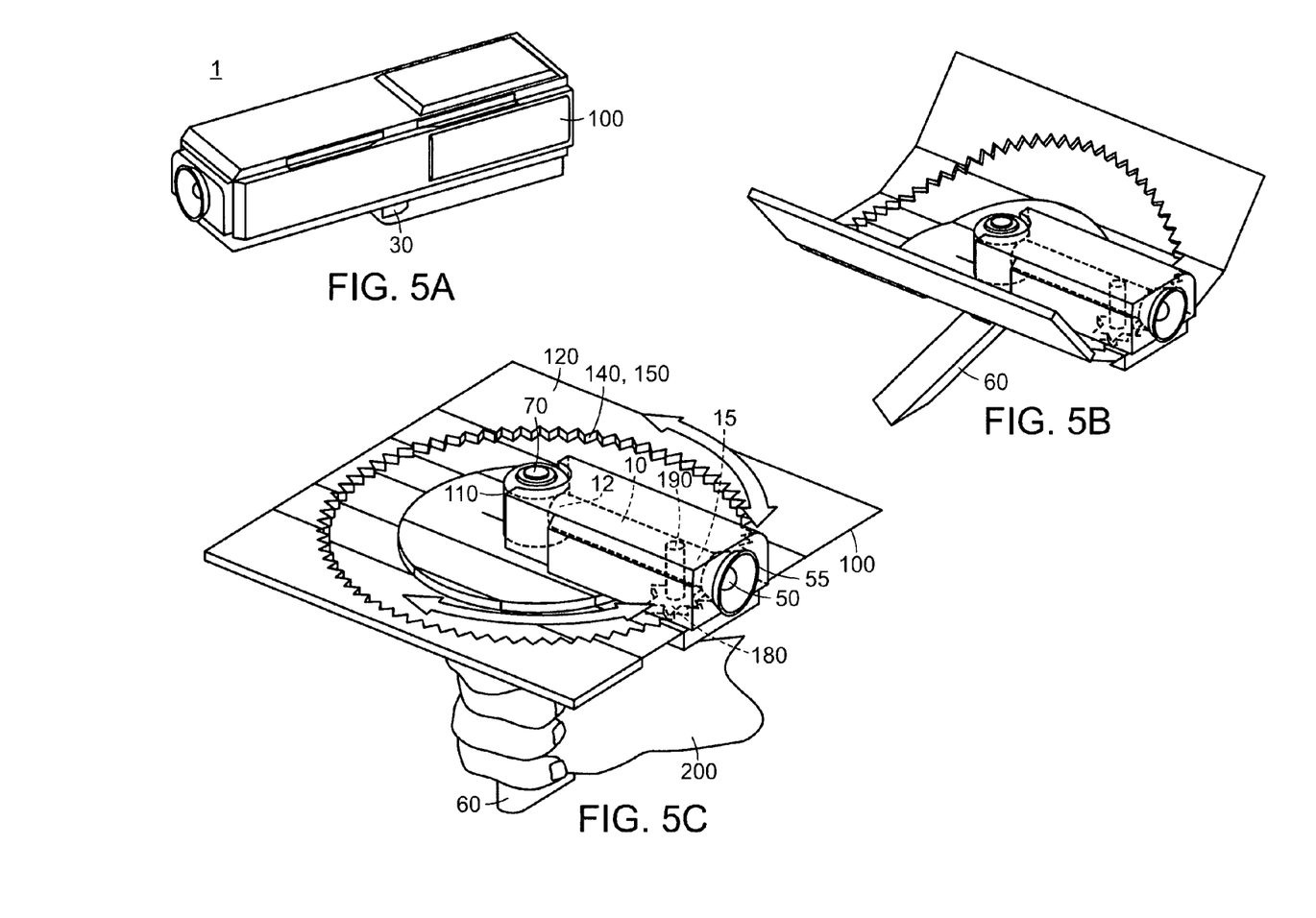
FIG. 5A shows a top perspective view of a fifth embodiment of the hand crank device having a crank plate that is closed.
FIG. 5B shows a top perspective view of a fifth embodiment of the hand crank device having a crank plate that is being opened.
FIG. 5C shows a top perspective view of a fifth embodiment of the hand crank device having a crank plate that is open and the hand crank device is being wielded.

FIGS. 5A, 5B, and 5C show top perspective views of a fifth embodiment of the hand crank device 1 having a crank plate 100. In FIG. 5A, the crank plate 100 is folded to a "closed" form as an outer casing. In FIG. 5B, the crank plate 100 is being opened. In FIG. 5C, the crank plate is unfolded to an "open" position and the hand crank device is being wielded to generate power.

As shown in FIG. 5C, the fifth embodiment of the hand crank device 1 comprises a handle 60 and a crank link 10, the handle 60 having a top end 70 and a bottom end 80, and a crank link 10 having a proximal end 12 and a distal end 15. The proximal end 12 of the crank link 10 rotatably connects to the top end 70 of the handle 60. The crank link 10 is generally perpendicular to the handle 60. In addition, the fifth embodiment also includes a crank plate 100 having a center 110 and a top side 120. On the periphery of the crank plate 100 there is a circular gear groove track 140 having gear grooves 150. The center 110 of the crank plate 100 attaches to the top end 70 of the handle 60 and the crank plate 100 is generally perpendicular to the handle 60. The crank link 10 is parallel to and positioned above the crank plate 100. Moreover, a gear wheel 180 is attached to the distal end 15 of the crank link 10. The gear wheel 180 engages the gear grooves 150.

The fifth embodiment is designed to be a flashlight. However, it should be noted that the fifth embodiment also encompass other models having similar handle-crank link-crank plate designs. The "functioning" component of the hand crank device 1 may differ, as indicated above. Here, the flashlight has a light source 50 housed in the crank link 10, which is shown in semi-transparent manner for clarity purposes. The reflector 55 of the light source may serve as a weight member that is positioned at the distal end 15 of the crank link 10.

The fifth embodiment shares some similar structures with the fourth embodiment. To enhance efficiency, the fifth embodiment also has a crank plate 100. However, here the gear grooves track 120 are engraved in the crank plate 100, not protruding out from the crank plate as in the fourth embodiment (FIG. 4). There gear grooves 150, therefore, are generally parallel to the crank plate 100. In addition, the gear wheel 180, in its current form, is parallel to the crank plate 100 and the crank link 10. The gear wheel 180 is attached to the crank link 10 via a transfer shaft 190. The gear wheel 180 may engage the gear grooves 150, transforming the rotation of the crank link 10 around the handle 60 to rotation of the gear wheel 180 and the transfer shaft 190, which is affixed to the gear wheel 180 and rotatably attached to the crank link 10. The "n/m" formula described for the fourth embodiment still holds true for the fifth embodiment.

In the fifth embodiment, the crank plate 100 is more elaborately designed so that it may serve more than one function. As shown in FIG. 5, the crank plate 100 may be folded so that it can cover the crank link 10, which is designed as a flashlight. The light source of the flashlight and its reflector, however, are not fully shielded by the folded crank plate 100. Therefore, the folded crank plate may serve as an outer shell of the flashlight. The handle 60 may attach to the crank plate 100 through a hinge 30, in similarly fashion as shown in FIG. 2, allowing the handle 60 to pivot against the crank link 10 and crank plate 100.

Figure 6:
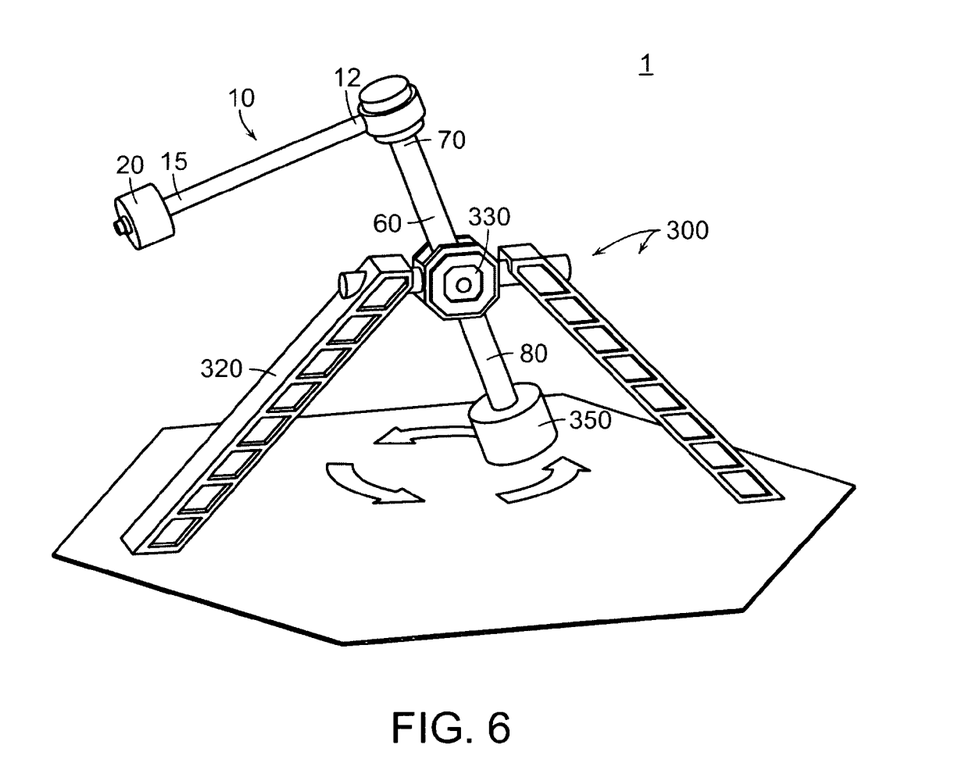
FIG. 6 shows a front perspective view of a six embodiment of the hand crank device with a sling support system.

FIG. 6 shows a front perspective view of a sixth embodiment of the hand crank device 1 with a sling support system. In some ways the sixth embodiment is similar to the first embodiment shown in FIG. 1. In FIG. 6, the hand crank device 1 has a handle 60 and a crank link 10, the handle 60 having a top end 70 and a bottom end 80, and a crank link 10 having a proximal end 12 and a distal end 15. The proximal end 12 of the crank link 10 rotatably connects to the top end 70 of the handle 60. The crank link 10 is generally perpendicular to the handle 60. A weight member 20 attaches to the proximal end 15 of the crank link 10. Here the generator and gear box are not shown for clarity purposes. In addition, shown in FIG. 6 is a sling rotator system 300 comprising: a sling support 320 and a sling joint 330 suspended by the sling support 320. The handle 60 threaded through the sling joint 300 and the handle-crank link combination is suspended by the sling rotator system 300. There is also a rotator weight member 350 attached to the bottom end 80 of the handle.

FIG. 6, as well as two other embodiments shown below, utilizes a sling rotator system 300. The structure of the sling support 320 may vary from what is shown in FIG. 6, as long as the sling support 320 provide stability to the system 300. The detailed structure of the sling joint 330 is known in the arts. The sling joint 330 allows the insertions into the sling joint 330 to rotate in all directions. In particular, attaching the handle 60 to the sling joint 330 allows the handle 60 to move in such a manner that the top end 70 and the bottom end 80 rotates around a common vertical axis in reverse directions. When the bottom end 80 rotates in a counter clockwise direction, as shown by the arrows in FIG. 6, the top end 70 rotates in a clockwise direction. The rotator weight member 350 attaches to the bottom end 80 of the handle 60, allowing the balanced rotation of the handle 60, the crank link 10, and additional structures. It should also be noted that the bottom end may rotate clockwise, while the top end may rotate counterclockwise, reverse to the arrows in FIG. 6.

To use the hand crank device 1 having the sling rotator system 300, the user propels the rotator weight member 350 into rotation, which triggers the rotation of the crank link 10, providing the motion that may power a generator. The entire motion is somewhat similar to the first embodiment.

Figure 7:
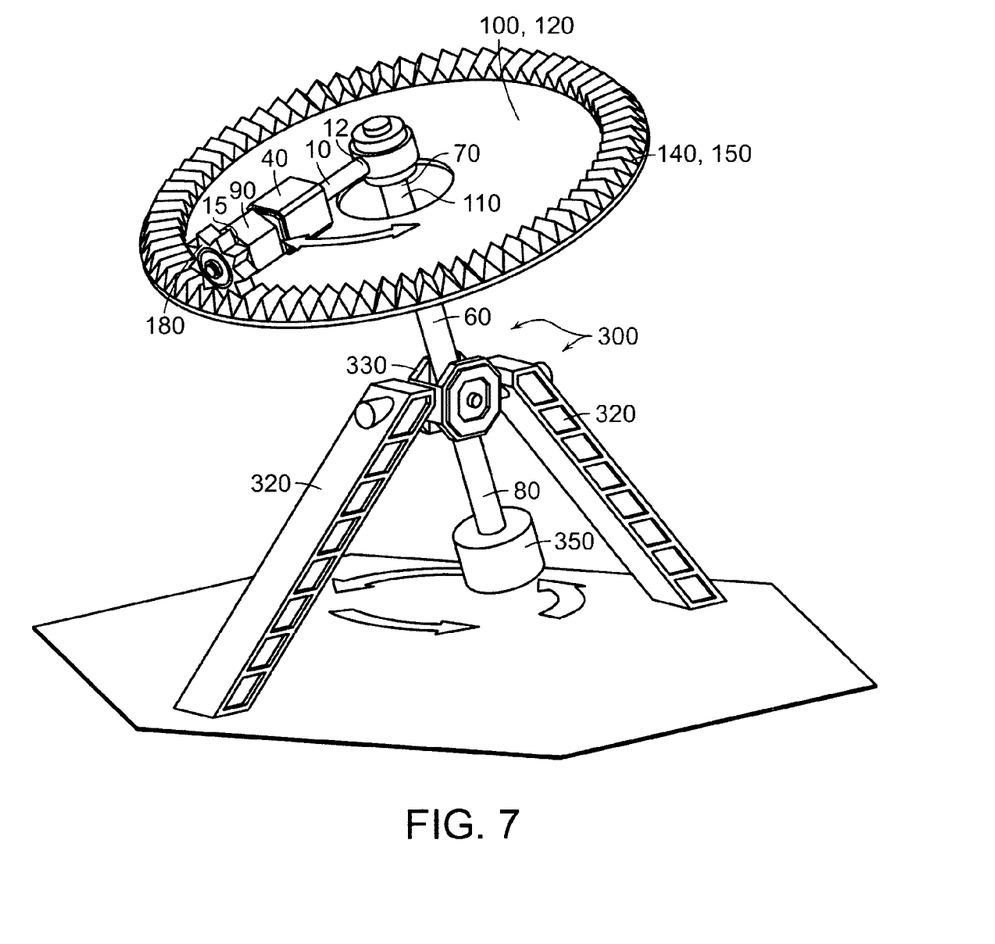
FIG. 7 shows a front perspective view of a seventh embodiment of the hand crank device with a sling support system and a crank plate.

FIG. 7 shows a front perspective view of a seventh embodiment of the hand crank device with a sling support system 300 and a crank plate 100. In some ways the seventh embodiment is similar to the fourth embodiment shown in FIGS. 4A and 4B. Here the hand crank device 1 comprises a handle 60 and a crank link 10, the handle 60 having a top end 70 and a bottom end 80, and a crank link 10 having a proximal end 12 and a distal end 15. The proximal end 12 of the crank link 10 rotatably connects to the top end 70 of the handle 60. The crank link 10 is generally perpendicular to the handle 60. In addition, the fourth embodiment also includes a crank plate 100 having a center 110 and a top side 120. On the periphery of the crank plate 100 there is a circular gear groove track 140 having gear grooves 150. The center 110 of the crank plate 100 attaches to the top end 70 of the handle 60 and the crank plate 100 is generally perpendicular to the handle 60. The crank link 10 is parallel to and positioned above the crank plate 100. Also shown in FIG. 7 is a generator 40 attached to the crank link 10. Moreover, a gear wheel 180 is attached to the distal end 15 of the crank link 10. The gear wheel 180 is generally perpendicular to the gear groove track 140 and engages the gear grooves 150. An optional gear box 90 may also be attached to the crank link 10 to facilitate the transmission of rotation to the powering of the generator 40. In addition, shown in FIG. 7 is a sling rotator system 300 comprising: a sling support 320 and a sling joint 330 suspended by the sling support 320. The handle 60 threaded through the sling joint 330 and the handle-crank link combination is suspended by the sling rotator system 300. There is also a rotator weight member 350 attached to the bottom end of the handle 60.

The seventh embodiment is similar to the fourth embodiment, with the addition of the sling rotator system 300, as shown in FIG. 7. With the sling rotator system, a user of the hand crank device may simply push the rotator weight member 350 to mimic a wielding effect so that the crank link 10 rotates like a clock hand around the handle. As indicated in the description for FIG. 4, the gear wheel 180 engages the gear grooves 150 so that the gear wheel 180 rotates around an axis along the clank link 10, driving the generator 40 to produce power for the hand crank device.

Figure 8:
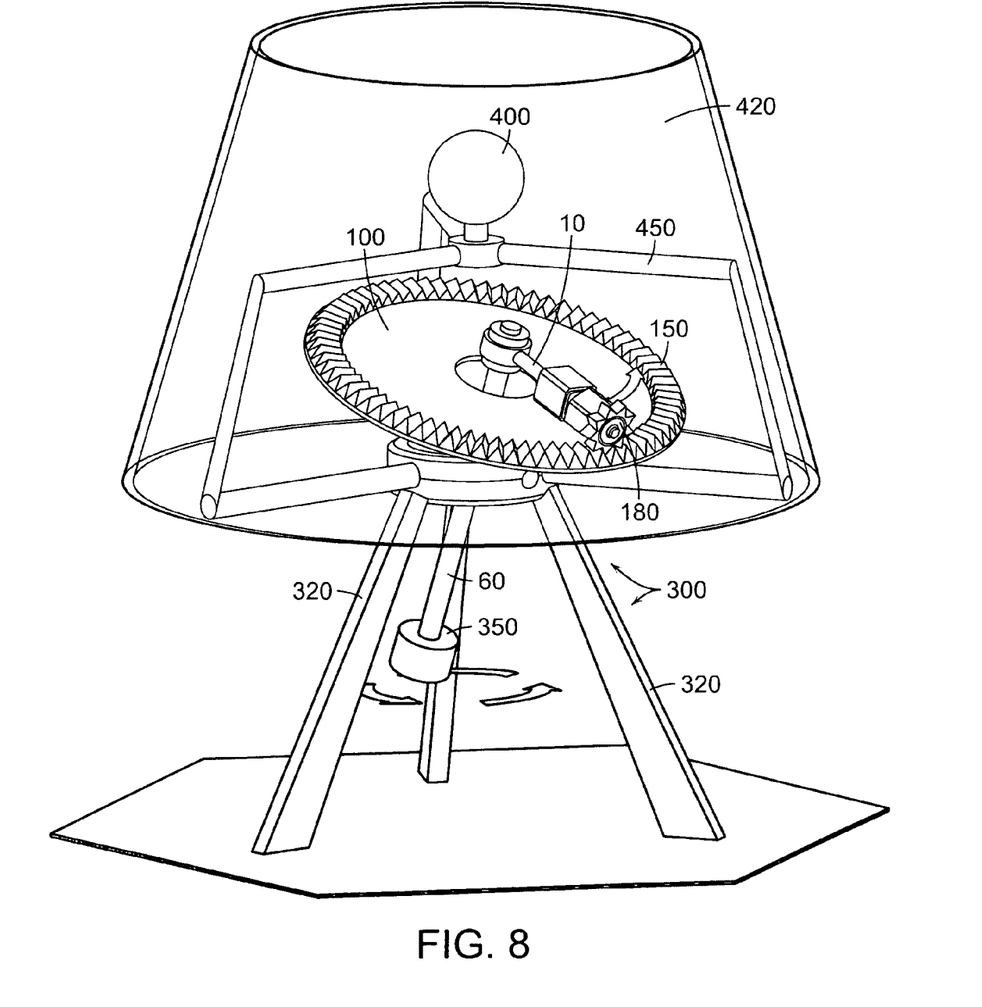
FIG. 8 shows a front perspective view of an eighth embodiment of the hand crank device with a sling support system, a crank plate, and a light cover.

FIG. 8 shows a front perspective view of an eighth embodiment of the hand crank device with a sling rotator system 300, a crank plate 100, and a light cover 420. The eighth embodiment is an improved version of the seventh embodiment with essentially the same elements arranged in a similar manner. In particular, the eighth embodiment is a lamp having a bulb 400, a lamp cover 420, and supporting frame 450. For clarity purposes, the front of the lamp cover 420 is shown as transparent to illustrate the other components.

The eighth embodiment is an improved and specialized version of the seventh embodiment. The basic components, including the crank link 10, the handle 60, the crank plate 100, the gear wheel 150, the gear grooves 180, and the sling rotator system, are essentially the same. However, the eighth embodiment adds more "functioning" components such as the bulb 400, the lamp cover 420, and the supporting frame 450 so that the hand crank device may be used as a lamp. The lamp may have its own AC or DC electricity sources. Preferably, the lamp may also include a rechargeable battery connected to the generator. In time of emergency, or simply for fun or exercise, the user may push the rotator weight member 350 to mimic a wielding effect, driving the crank link 10 and gear wheel 180 to rotate to produce electricity for the use of the hand crank device. Moreover, as indicated above, the hand crank device may be used in an "up-side-down" manner. The rotator weight member 350 may be on top and the crank plate 100 may be at the bottom. Accordingly, other components may be arranged as that the rotation of the rotator weight member 350 at the top creates a wielding motion that drives the hand crank device.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A generator assembly, comprising:
   a generator;
   a handle having a top end and a bottom end, the handle functionally connected to the generator,
   and a crank link having a proximal end and a distal end, wherein
      the proximal end of crank link rotatably connects to the top end of the handle,
      the crank link is capable of being positioned perpendicular to the handle,
      and holding the handle and wielding the generator assembly allows the crank link to rotate around the handle, enabling the generator to provide power to the generator assembly;
   a hinge connecting the crank link to the handle, the hinge allowing the crank link to pivot against the handle between a parallel position and a perpendicular position;
   a weight member attached to the distal end of the crank link;
   a light source functionally connected to the generator, wherein the handle is hollow with a handle interior, and
      wherein holding the handle and wielding the generator assembly allows the crank link to rotate around the handle, enabling the generator to provide power to the light source.

2. The generator assembly of claim 1, wherein
   the crank link is hollow with a crank link interior,
   and the light source resides in the crank link interior.

3. The generator assembly of claim 1, further comprising
   a rechargeable battery functionally connected to the generator, wherein power provided by the generator charges the rechargeable battery.

4. The generator assembly of claim 1, further comprising
   a gearbox functionally connected to the crank link.

5. The generator assembly of claim 1, wherein
   the weight member is capable of being attached to or detached from the top end of the handle.

6. A generator assembly, comprising:
   a crank link having a proximal end and a distal end;
   a generator functionally connected to the crank link;
   a handle having a top end and a bottom end;
   a crank plate having a center and a circular gear groove track on top of the crank plate;
   and a gearwheel attached to the distal end of the crank link, wherein
      the proximal end of the crank link rotatably connects to the top end of the handle and is capable of being positioned perpendicular to the handle,
      the center of the crank plate attaches to the top end of the handle,
      the crank plate is capable of being positioned perpendicular to the handle,
      the crank link is positioned above the crank plate,
      the gear groove track has gear grooves that engages the gearwheel,
      and holding the handle and wielding the generator assembly makes the crank link rotate around the handle, causing the gearwheel to rotate and enabling the generator to provide power to the generator assembly.

7. The generator assembly of claim 6, wherein
   the gearwheel shares an axis with the crank link and is positioned perpendicular to the gear plate, and a part of the crank link rotates around the axis, enabling the generator to provide power.

8. The generator assembly of claim 7, wherein
   the crank link has a center shaft and an outer shaft, the outer shaft rotatably encircles the center shaft along the crank link,
   the center shaft is capable of rotating around the axis.

9. The generator assembly of claim 6, wherein
   the crank plate is foldable and is capable of being folded around the crank link, shielding the crank link.

10. The generator assembly of claim 6, further comprising
    a light source functionally connected to the generator, wherein
       the crank link is hollow with a crank link interior,
       and the light source resides in the crank link interior.

11. The generator assembly of claim 6, further comprising
    a hinge connecting the crank link to the handle,
    the hinge allows the crank link to pivot against the handle between a parallel position and a perpendicular position.

12. The generator assembly of claim 6, further comprising
    a vertical connector linking the gear wheel to the crank link, wherein
       the gearwheel is perpendicular to the crank link and is positioned parallel to the gear plate,
       the gear groove track is embed in the crank plate and the gear grooves engage the gearwheel,
       rotation of the crank link around the handle is transmitted to vertical rotation of the gearwheel by the vertical connector,
       and the generator is positioned on the gearwheel.

13. The generator assembly of claim 12, further comprising
    a weight member, wherein
       the weight member attaches to the distal end of the crank link.

14. A generator assembly, comprising:
    a sling rotator system comprising:
       a sling support,
       and a sling joint suspended by the sling support;
    a handle having a top end and a bottom end, the handle threaded through the sling joint;
    a generator functionally connected to the handle;
    a rotator weight member attached to the bottom end of the handle;
    and a crank link having a proximal end and a distal end, wherein
       the proximal end of crank link rotatably connects to the top end of the handle,
       the crank link is capable of positioned perpendicular to the handle,
       and pushing the rotator weight member to rotate compels the crank link to rotate around the handle, enabling the generator to provide power to the generator assembly.

15. A generator assembly, comprising:
    a sling rotator system comprising:
       a sling support,
       and a sling joint suspended by the sling support;
    a crank link having a proximal end and a distal end;
    a weight member attaches to the distal end of the crank link;
    a generator functionally connected to the crank link;
    a handle having a top end and a bottom end, the handle threaded through the sling joint;
    a crank plate having a center and a circular gear groove track on top of the crank plate;

and a gearwheel attached to the distal end of the crank link, wherein
- the proximal end of the crank link rotatably connects to the top end of the handle and is capable of being positioned perpendicular to the handle,
- the center of the crank attaches to the top end of the handle,
- the crank plate is capable of being positioned perpendicular to the handle,
- the crank link is capable of being positioned above the crank plate,
- the gear groove track has gear grooves that engages the gearwheel,
- and pushing the rotator weight member to rotate compels the crank link to rotate around the handle, causing the gearwheel to rotate and enabling the generator to provide power to the generator assembly.

16. The generator assembly of claim 15, wherein
the gearwheel shares an axis with the crank link and is positioned perpendicular to the gear plate,
and a part of the crank link rotates around the axis, enabling the generator to provide power.

* * * * *